Patented Apr. 20, 1926.

1,581,804

UNITED STATES PATENT OFFICE.

JESS D. KIMMEL AND RALPH J. McMAHON, OF DAYTON, OHIO.

LUBRICANT.

No Drawing.   Application filed August 8, 1923.   Serial No. 656,458.

*To all whom it may concern:*

Be it known that we, JESS D. KIMMEL and RALPH J. McMAHON, citizens of the United States, residing at Dayton, in the county of Montgomery and State of Ohio, have invented an Improved Lubricant, of which the following is a specification.

This invention relates to an improved lubricant especially adaptable for locomotive journal-boxes and more generally for heavy duty bearings.

In locomotive journal-boxes the relation of the coacting bearing surfaces one with another is such that the lubricant for the bearing to be effective must have body, as transmission grease, and an added element which will act to keep the lubricant suspended between or spread over the bearing surfaces. This added quality of the lubricant is highly important because of the end play of the journals which results in a short time in causing excessive friction and wear of the bearings if the lubricant between the bearing surfaces is insufficient or lacks the quality to act as a buffer to the end play of the journals thus to maintain effective lubrication and minimize the wear of the bearings.

In the present practice of locomotive operation the journal-boxes require adjustment at relatively short intervals to take up the excessive end play which results from the rapid wear of the bearing surfaces caused by failure of the lubricants used to properly protect the bearings against the constant end thrust of the journals. Much labor is involved in making these adjustments and heavy loss results from having the locomotives idle during the frequent intervals when they are taken out of service to have the journal boxes adjusted.

The main object in the present invention is, therefore, to provide a lubricant which has the quality of remaining suspended, and thus to act as a buffer, between coacting bearing surfaces, having particular reference to the bearing surfaces of locomotive journal-boxes, which will be more effective to minimize the friction and wear of the parts and thus enable operation of the locomotives for longer intervals between adjustments of the journal-boxes.

As a base for the improved lubricant various grades of heavy grease or oil, preferably transmission lubricants, are used. Wood fibre in the form of fine excelsior cut coarse, being cut to lengths of one-half to one inch, variable to suit the consistency of the lubricant, is then thoroughly mixed with the lubricant in proportions averaging ten pounds of lubricant to one pound of wood fibre according to the character of the lubricant and the condition of the bearings to which it is to be applied. The compound thus prepared is in semi-fluid or light grease form, thus having the required body to produce the desired effect in the journal bearings.

A modification of the compound is prepared by mixing with the wood fibre sisal or manila fibre, cut in lengths corresponding to the wood fibre, in proportions averaging five pounds of wood fibre to one pound of the other fibre.

In either form the compound thus prepared will be of the nature of a fibrous lubricating pulp which as applied will have the important quality of remaining spread over or suspended between coacting bearing surfaces, as in the journal-boxes of locomotives, for prolonged intervals, and will thus act more effectively to keep the bearing surfaces properly lubricated and also as a buffer to the shocks transmitted to the bearings by the end thrust of the journals.

In the various modifications of the compound the lubricant adheres to and is absorbed to some extent by the fibrous material and the fibres also adhere one with another thus forming a mesh which acts to keep the lubricant suspended between the fibres and the whole mass to remain spread over the bearing surfaces to better effect than would result if the fibrous material were not added to the lubricant.

When wood fibre only is used in the mixture the compound will be of heavier or firmer consistency and the fibres will separate more readily under the action of the lubricant in the bearing. The added proportion of sisal or manila fibre produces a lighter and more plastic compound and the fibres mesh more readily as the lubricant is applied, and thus act to greater extent to keep the lubricant spread over the bearing surfaces.

In the preparation of lubricating compound of this character other materials may be used which will serve as equivalents to the wood, sisal and manila fibres. The essential requirement of this added element, in whatever form, is the fibrous quality of the element, the fibres being cut coarse and mixed with the lubricant in right proportions to produce the desired results. Materials as saw-dust, paper pulp, vegetable pulps, asbestos pulp, leather, sponge, etc., in which fibre in suitable lengths does not predominate have been used heretofore in lubricating compounds but have been found to be ineffective and unsuitable for lubricating purposes as herein described.

Having described our invention, we claim:

1. A lubricating compound consisting of a heavy lubricant as a base mixed with coarse cut wood fibre in average proportions of ten pounds of lubricant to one pound of fibre to effect a plastic compound.

2. A lubricating compound consisting of a heavy lubricant as a base mixed with coarse cut wood fibres and sisal in average proportions of ten pounds of lubricant, one pound of wood fibre and one-fifth pound of sisal fibre to effect a semi-fluid compound.

In testimony whereof, we affix our signatures.

JESS D. KIMMEL.
RALPH J. McMAHON.